United States Patent [19]

Flemming, Jr. et al.

[11] Patent Number: 5,419,513

[45] Date of Patent: May 30, 1995

[54] ANCILLARY AERODYNAMIC STRUCTURES FOR AN UNMANNED AERIAL VEHICLE HAVING DUCTED, COAXIAL COUNTER-ROTATING ROTORS

[75] Inventors: Robert J. Flemming, Jr., Trumbull; Kenneth M. Rosen, Guilford; Thomas W. Sheehy, Hamden, all of Conn.

[73] Assignee: United Technologies Corporation, Hartford, Conn.

[21] Appl. No.: 60,337

[22] Filed: May 11, 1993

[51] Int. Cl.⁶ .................................................. B64C 27/02
[52] U.S. Cl. .................................. 244/12.2; 244/17.11; 244/36; 244/45 R
[58] Field of Search ............... 244/12.2, 23 C, 36, 244/17.11, 45 R, 17.19, 12.1, 23 R

[56] References Cited

U.S. PATENT DOCUMENTS

| | | | |
|---|---|---|---|
| 2,118,254 | 5/1938 | Loedding | 244/36 |
| 2,430,820 | 11/1947 | Lightfoot | 244/36 |
| 2,994,493 | 8/1961 | Hartman | 244/36 |
| 4,196,877 | 4/1980 | Mutrux | 244/23 C |
| 5,035,377 | 7/1991 | Buchelt | 244/12.1 |
| 5,039,031 | 8/1991 | Valverde | 244/12.2 |
| 5,149,012 | 9/1992 | Valverde | 244/23 C |
| 5,150,857 | 9/1992 | Moffitt et al. | 244/12.2 |
| 5,156,358 | 10/1992 | Gerhardt | 244/36 |

*Primary Examiner*—Galen L. Barefoot
*Attorney, Agent, or Firm*—Terrance J. Radke

[57] ABSTRACT

An unmanned aerial vehicle (UAV) having a toroidal fuselage and a rotor assembly including counter-rotating rotors coaxially mounted with respect to the toroidal fuselage incorporates ancillary aerodynamic structures aerodynamically configured and mounted in combination with the toroidal fuselage to provide a nose-down pitching moment to counteract the nose-up pitching moment generated by airflow over the toroidal fuselage during forward translational flight of the UAV. The ancillary aerodynamic structures have a cambered airfoil profile to provide high lifting forces. The ancillary aerodynamic structures may have centers of lift located significantly aft of the quarter-chord line of the airfoil, and are symmetrically mounted in combination with the lateral sides of the toroidal fuselage so that the centers of lift are located aftwardly of the fuselage axis of the toroidal fuselage in forward translational flight modes such that the ancillary aerodynamic structures generate a nose-down pitching moment to counteract the nose-up pitching moment due to airflow over the toroidal fuselage in forward translational flight. In a first embodiment, the ancillary aerodynamic structures are fixedly mounted in combination with the toroidal fuselage at a predetermined angle of incidence. In a second embodiment, the ancillary aerodynamic structures are rotatably mounted in combination with the toroidal fuselage to provide variable incidence ancillary aerodynamic structures for the UAV.

4 Claims, 7 Drawing Sheets

$V'_{IN_{FWD}} = V_{IN_{FWD}} + V_0$      $V'_{IN_{AFT}} = V_{IN_{AFT}} - V_0$

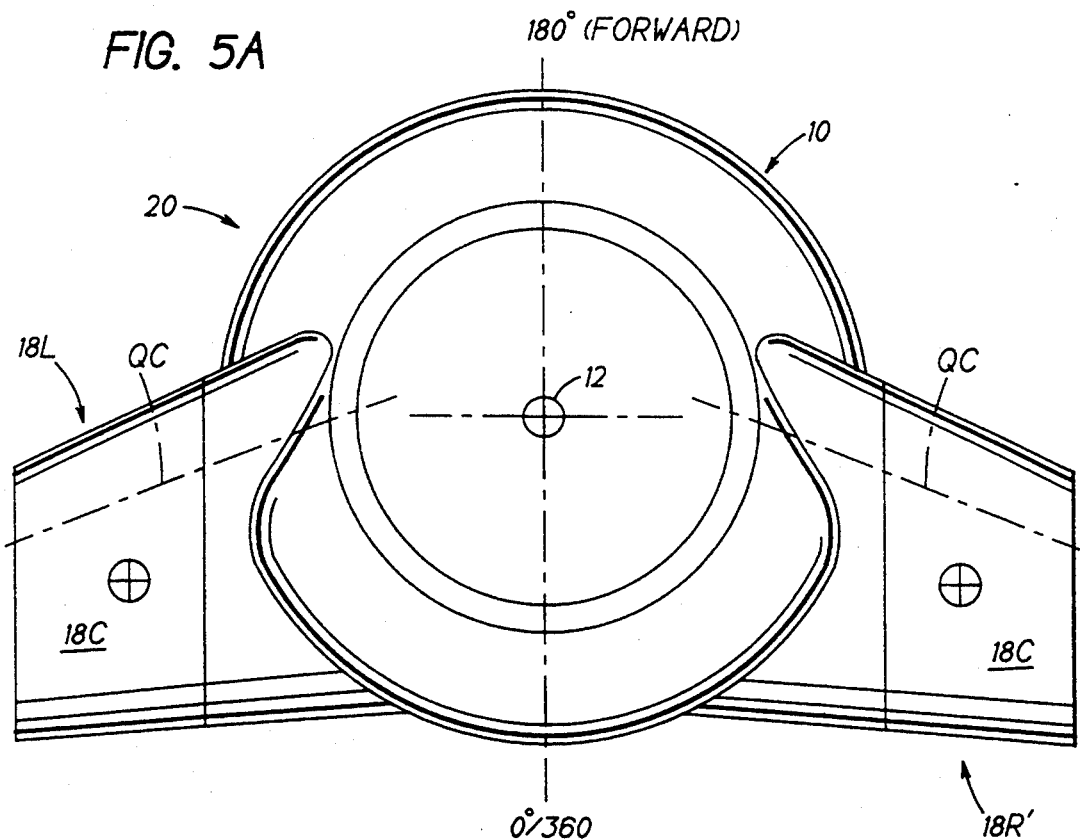
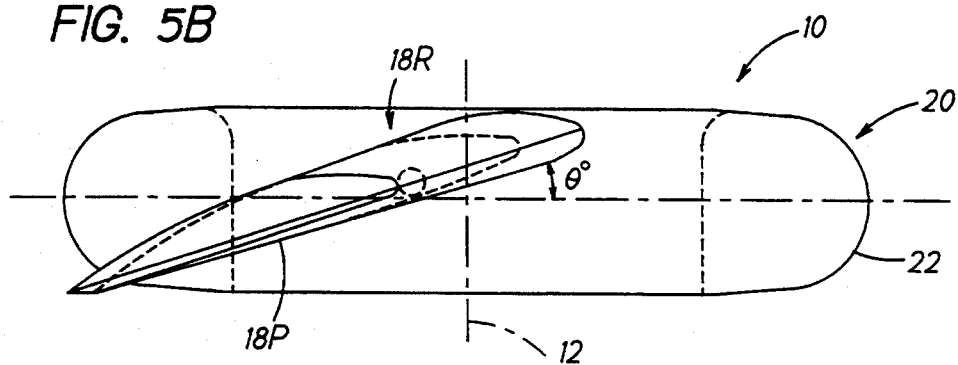
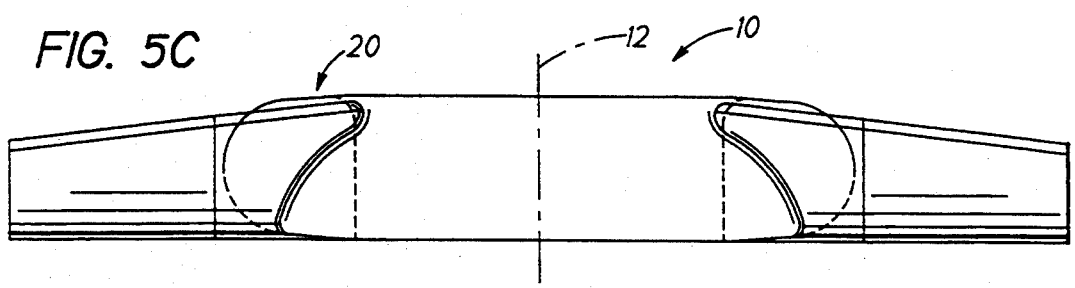

ANCILLARY AERODYNAMIC STRUCTURES FOR AN UNMANNED AERIAL VEHICLE HAVING DUCTED, COAXIAL COUNTER-ROTATING ROTORS

RELATED APPLICATION

The present application is related to U.S. Pat. No. 5,150,857, entitled SHROUD GEOMETRY FOR UNMANNED AERIAL VEHICLES, and U.S. Pat. No. 5,152,478, entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS, both of which are owned by the assignee of the present application.

TECHNICAL FIELD

The present invention relates to unmanned aerial vehicles (UAVs), and more particularly, to a UAV having a toroidal fuselage (shroud) and a pair of coaxial, counter-rotating, ducted, multi-bladed rotors, and which includes ancillary aerodynamic structures mounted in combination with the toroidal fuselage and having an aerodynamic configuration optimized to generate nose-down pitching moments to counteract the nose-up pitching moments generated by airflow over the toroidal fuselage in forward translational flight.

BACKGROUND OF THE INVENTION

There has been a recent resurgence in the interest in unmanned aerial vehicles (UAVs) for performing a variety of missions where the use of manned flight vehicles is not deemed appropriate, for whatever reason. Such missions include surveillance, reconnaissance, target acquisition and/or designation, data acquisition, communications datalinking, decoy, jamming, harassment, or one-way supply flights. This interest has focused mainly on UAVs having the archetypical airplane configuration, i.e., a fuselage, wings having horizontally mounted engines for translational flight, and an empennage, as opposed to "rotor-type" UAVs (UAVs having a vertical take-off and landing capability), for several reasons.

First, the design, fabrication, and operation of "winged" UAVs is but an extrapolation of the manned vehicle flight art, and therefore, may be accomplished in a relatively straightforward and cost effective manner. In particular, the aerodynamic characteristics of such UAVs are well documented such that the pilotage (flight operation) of such vehicles, whether by remote communications datalinking of commands to the UAV and/or software programming of an on-board flight computer, is relatively simple.

In addition, the range and speed of such UAVs is generally superior to rotor-type UAVs. Moreover, the weight-carrying capacity of such UAVs is generally greater than rotor-type UAVs such that winged UAVs may carry a larger mission payload and/or a larger fuel supply, thereby increasing the vehicle's mission efficiency. These characteristics make winged UAVs more suitable than rotor-type UAVs for certain mission profiles involving endurance, distance, and load capability. Winged UAVs, however, have deficiencies that severely limit their utility.

More specifically, winged UAVs do not have a fixed spatial point "loiter" capability nor a vertical takeoff/landing (VTOL) capability. For optimal performance of many of the typical mission profiles described hereinabove, it is desirable that the UAV have the capability to maintain a fixed spatial frame of reference with respect to static ground points for extended periods of time, e.g., target acquisition. One skilled in the art will appreciate that the flight characteristics of winged UAVs are such that winged UAVs cannot maintain a fixed spatial frame of reference with respect to static ground points, i.e., loiter. Therefore, mission equipment for winged UAVs must include complex, sensitive, and costly motion-compensating means to suitably perform such mission profiles, i.e., maintenance of a constant viewing azimuth with respect to a static ground point.

Furthermore, some mission profiles are not conducive to the use of winged UAVs, which require an environment suitable for horizontal takeoffs and landings or an elaborate launching mechanism, i.e., such mission profiles are most expeditiously accomplished by UAVs having a VTOL capability. Rotor-type UAVs having a VTOL capability, for example, are ideally suited for real time reconnaissance, surveillance, and data acquisition missions for front line tactical units. In addition, such UAVs may be used to advantage in shipboard environments where space is at a premium.

Rotor-type UAVs are aerodynamically suited for mission profiles requiring a VTOL and/or loiter capability. The rotor(s) of the main rotor assembly of such UAVs may be operated for vertical takeoffs and landings and to effect hovering at a fixed spatial frame of reference with respect to static ground points. Prior art ducted rotor-type UAV designs, however, experience nose-up pitching moments in forward translational flight. To facilitate a more complete understanding of the aerodynamic characteristics of ducted rotor-type UAVs, and in particular, the nose-up pitching phenomenon, reference is made to FIGS. 1A–1E which illustrate the aerodynamic airflow patterns, pressure distributions (in terms of suction pressure), and pitching moments for a ducted rotor-type UAV having a toroidal fuselage of generally hemicylindrical profile.

FIG. 1A illustrates the aerodynamics of a rotor-type UAV in hover flight, i.e., the UAV is stationary with respect to, and a predetermined distance above, the ground plane. To effect hover flight in a rotor-type UAV, only collective pitch is applied to the rotor R, i.e., the blades of each blade set exhibit the same blade pitch angle regardless of individual blade azimuthal orientation. Rotation of the rotor R induces airflow through the rotor blades, which produces the illustrated pressure distribution $PD_R$ across the span of the blades. Each rotor blade has an equivalent pressure distribution $PD_R$ regardless of its azimuthal orientation such that the pressure distribution across the rotor R is symmetrical with respect to the rotational/fuselage axis of the UAV.

Airflow through the rotor R causes air to be drawn across the upper and duct inlet surfaces of the toroidal fuselage F and to flow through the fuselage duct FD due to the RPM of the rotor R (engine power setting), the arcuate shape of the inlet surface, and the diameter of the fuselage duct FD. This airflow generates a resultant pressure distribution $PD_F$ over the upper and duct inlet surfaces of the toroidal fuselage F that is constant for all azimuthal orientations, as illustrated in FIG. 1A, i.e., the toroidal pressure distribution $PD_F$ is symmetrical with respect to the fuselage axis.

The rotor and fuselage pressure distributions $PD_R$, $PD_F$ cause lifting forces to be exerted on the rotor R and toroidal fuselage F, respectively, that maintain the UAV in a hover at a fixed spatial point with respect to, and at a predetermined distance above, the ground plane. As an examination of FIG. 1A shows, the lift forces generated by the rotor R and the toroidal fuselage F of a rotor-type UAV are additive in hover flight. Moreover, there are no unbalanced pitching moments acting on the UAV due to the symmetry of the rotor and fuselage air pressure distributions $PD_R$, $PD_F$.

The aerodynamic effects resulting from the application of cyclic pitch to a UAV in hover flight are illustrated in FIG. 1B wherein the UAV rotor is simultaneously subjected to collective and cyclic pitch. The individual rotor blades exhibit dissimilar blade pitch angles depending upon blade azimuthal orientation and direction of the applied cyclic input (forward, lateral, aft, or combinations inbetween). Rotation of the rotor R under the influence of both collective and cyclic pitch causes airflow through the rotor blades that produces an asymmetric rotor pressure distribution that is dependent upon the direction of the applied cyclic input. For example, for an applied cyclic input in the forward direction, the asymmetric pressure distribution illustrated in FIG. 1B results wherein $PD_{RFWD}$ represents the pressure distribution of a rotor blade having a 180° azimuthal orientation (forward) and $PD_{RAFT}$ represents the pressure distribution of a blade having a 0°/360° azimuthal orientation (aft).

An examination of FIG. 1B shows that the magnitude of the resultant pressure distribution is a maximum along the azimuthal orientation opposite the direction of the applied cyclic input and a minimum along the azimuthal orientation in the direction of the applied cyclic input, i.e., $PD_{RAFT}$ is greater than $PD_{RFWD}$. Cyclic pitch, therefore, causes an asymmetric rotor pressure distribution with respect to the center of gravity that results in a net rotor pitching moment $M_R$ in the direction of the applied cyclic input. With respect to FIG. 1B and the example described in the preceding paragraph, the net rotor pitching moment $M_R$ is a counterclockwise moment in the forward direction (180° azimuth).

For the UAV subjected to such cyclic and collective pitch inputs, the airflow through the rotor R induces airflow across the upper and arcuate inlet surfaces of the toroidal fuselage F resulting in an asymmetrical velocity distribution. This asymmetrical velocity distribution produces the asymmetrical toroidal fuselage pressure distribution illustrated in FIG. 1B wherein $PD_{FFWD}$ represents the pressure distribution across the upper and arcuate inlet surfaces of the toroidal fuselage F at the 180° azimuthal orientation and $PD_{FAFT}$ represents the pressure distribution across the upper and arcuate inlet surfaces of the toroidal fuselage F at the 0°/360° azimuthal orientation.

Cyclic pitch, therefore, also causes an asymmetrical toroidal fuselage pressure distribution with respect to the rotational axis of the UAV that results in a net toroidal fuselage pitching moment $M_F$ in the direction of the applied cyclic input (counterclockwise in FIG. 1B), i.e., $PD_{FAFT}$ is greater than $PD_{FFWD}$. The direction of the applied cyclic input may be varied to cause airflow velocity maxima or minima over the upper and arcuate inlet surfaces of the toroidal fuselage F at any desired azimuthal orientation.

The asymmetric pressure distributions generated by the rotor R and the toroidal fuselage F cause lifting forces to be exerted on the rotor R and the toroidal fuselage F. These lifting forces are additive. In this flight mode, however, there are unbalanced pitching moments acting on the UAV. The net rotor and toroidal fuselage pitching moments $M_R$ and $M_F$ act in concert (moments are additive) to generate a system moment $M_S$ as illustrated in FIG. 1B.

A large portion of the system moment $M_S$ results from the net toroidal fuselage pitching moment $M_F$ (about 50%). Changes in cyclic pitch, which produce changes in net rotor pitching moment $M_R$, produce similar changes in the net toroidal fuselage pitching moment $M_F$. The significance of this characteristic is important when considering the amount of cyclic pitch needed to counteract the nose-up pitch instability of UAVs in forward translational flight modes.

FIGS. 1C-1E illustrate the aerodynamic effects acting on a UAV in forward translational flight, i.e., the UAV rotor R is simultaneously subjected to collective and cyclic pitch that causes UAV translational motion with respect to the ground plane. The applied cyclic input is assumed to cause forward motion of the UAV, i.e., a velocity vector along the 180° azimuthal orientation or to the left in FIGS. 1C-1E. Such a flight condition causes airflow through the rotor blades that produces an asymmetric rotor pressure distribution that is dependent upon the direction of applied cyclic input as described hereinabove. An examination of FIG. 1E shows that the magnitude of the resultant rotor pressure distribution is maximum along the azimuthal orientation opposite the direction of applied cyclic input (0°/360°) and a minimum along the azimuthal orientation in the direction of applied cyclic input 180°), i.e., $PD_{RAFT}$ is greater than $PD_{RFWD}$. Cyclic pitch, therefore, causes an asymmetric rotor pressure distribution with respect to the rotational axis of the UAV that results in a net rotor pitching moment $M_R$ in the direction of the applied cyclic input (counterclockwise or in the forward direction as illustrated in FIG. 1E).

Airflow through the rotor R induces airflow ($V_{INFWD}$ and $V_{INAFT}$) across the upper and arcuate inlet surfaces of the toroidal fuselage F. In the case of a UAV in forward translational flight, however, the resultant velocity of the airflow across these surfaces at the 180° and 0°/360° azimuthal orientations ($V'_{INFWD}$ and $V'_{INAFT}$, respectively) is affected by the free stream velocity $V_O$ due to the translational motion of the UAV. The free stream velocity $V_O$ is additive with respect to the velocity $V_{INFWD}$ and subtractive with respect to the velocity $V_{INAFT}$, as illustrated in FIG. 1C. The net effect of such resultant velocities is the production of asymmetric pressure distributions $PD_{FFWD}$ and $PD_{FAFT}$, as illustrated in FIG. 1D.

Since $PD_{FFWD}$ is greater than $PD_{FAFT}$, the asymmetric pressure distributions generated by the airflows across the upper and arcuate inlet surfaces of the toroidal fuselage F result in a net toroidal fuselage pitching moment $M_F$ in the clockwise direction as illustrated in FIG. 1D. Without cyclic input, the magnitude of the net toroidal fuselage pitching moment $M_F$ is greater than the magnitude of the net rotor pitching moment $M_R$, and accordingly, the system moment $M_S$ has the same rotational sense as the net toroidal fuselage pitching moment $M_F$. The system moment $M_S$ without cyclic is a nose-up pitching moment (clockwise) in a UAV in forward translational flight modes as illustrated in FIG. 1E.

There are several options which may be utilized to counteract the nose-up pitch tendency of rotor-type UAVs in forward translational flight modes. One possible option is to utilize cyclic pitch to counteract such nose-up pitching tendencies. The utilization of cyclic pitch to counteract the nose-up pitching tendency of UAVs is disclosed in U.S. Pat. No. 5,152,478. Cyclic pitch is applied to an adversely affected UAV in such manner that the net toroidal fuselage pitching moment $M_F$ is effectively canceled by the net rotor pitching moment $M_R$. This option is based upon the characteristic described hereinabove wherein changes in cyclic pitch produce changes in the net rotor pitching moment $M_R$ and similar changes in the net toroidal fuselage pitching moment $M_F$.

The system pitching moment $M_S$ acting upon a UAV in forward translational flight modes comprises the net toroidal fuselage pitching moment $M_F$, which is a nose-up pitching moment, minus the net rotor pitch moment $M_R$, which is generally a nose-down (negative) pitching moment. Mathematically, this may be expressed as:

$$M_S = M_F + M_R$$

During forward translational flight, $$M_F = M_{FF} + M_{CS}$$

where $M_{FF}$ is the toroidal fuselage pitching moment normally produced during forward flight modes and $M_{CS}$ is the toroidal fuselage pitching moment created in response to changes in cyclic pitch (generally negative). Thus, the system moment $M_S$ for a UAV in forward translational flight modes may be expressed as:

$$M_S = (M_{FF} + M_{CS}) + M_R$$

Cyclic pitch is applied so as to change $M_{CS}$, thereby causing $M_F$ to decrease. The overall effect is that the net nose-up pitching moment, $M_{FF} + M_{CS}$, is counteracted by the nose-down pitching moment, $M_R$, at a predetermined cyclic pitch setting. At such predetermined cyclic pitch setting, which results in a negative angle of attack for the UAV in forward translational flight modes, the UAV is aerodynamically trimmed for forward flight, i.e., $M_S = 0$.

While the application of cyclic pitch, as disclosed in the '478 patent, represents a viable option to counteract the fuselage-induced nose-up pitching moments experienced by ducted rotor-type UAVs in forward translational flight modes, this option incurs a performance penalty. More specifically, this option increases the power requirements of the UAV in forward translational flight modes. The application of cyclic pitch to counteract the net nose-up pitching moment also results in lost lift, which must be compensated for by increasing the collective input to the rotor assembly.

Another possible option is to design optimize the toroidal fuselage airfoil profile to counteract such nose-up pitching tendencies of the UAV during forward translational flight modes. The utilization of an optimized toroidal fuselage airfoil profile to counteract the nose-up pitching tendency of UAVs is disclosed in U.S. Pat. No. 5,150,857. The outer aerodynamic surface of the toroidal fuselage is design optimized to provide an asymmetrical toroidal fuselage pressure distribution that produces high lift forces during forward translational flight modes. The high lift forces reduce the required lift provided by the rotor assembly, thereby reducing the undesirable nose-up pitching moment. A reduction in required power is effected by the decreased requirement for rotor lift and the reduced need for superimposed cyclic pitch (moment trim).

While the incorporation of a toroidal fuselage having a design optimized outer aerodynamic surface, as disclosed in the '857 patent, represents a viable option to help counteract the fuselage-induced nose-up pitching moments experienced by ducted rotor-type UAVs in forward translational flight, this option incurs a manufacturing penalty and may have an adverse effect on higher speed flight characteristics. More specifically, a toroidal fuselage having a design optimized outer aerodynamic surface is a more complex structure to fabricate than a UAV having a hemicylindrical outer aerodynamic surface, such that the overall UAV system cost is increased. In addition, a UAV embodying such a toroidal fuselage may require more aft cyclic at higher forward flight speeds.

A need exists for rotary-type UAVs for a wide variety of reconnaissance, surveillance, target acquisition, and/or communication missions, especially at the tactical level. Such UAVs should embody a means for counteracting the undesirable nose-up pitching moments experienced by ducted rotary-type UAVs in forward translational flight modes. Such means should minimize cyclic trim pitch requirements and rotor assembly power requirements while concomitantly providing high hover efficiency.

SUMMARY OF THE INVENTION

One object of the present invention is to provide an unmanned aerial vehicle (UAV) having a toroidal fuselage and a rotor assembly including counter-rotating rotors coaxially mounted in combination with the toroidal fuselage that incorporates ancillary aerodynamic structures to provide a nose-down pitching moment to counteract the nose-up pitching moment generated by airflow over the toroidal fuselage during forward translational flight modes of the UAV.

Another object of the present invention is to provide a UAV incorporating ancillary aerodynamic structures having a highly cambered airfoil profile wherein the ancillary aerodynamic structures provide high lifting forces during forward translational flight modes of the UAV.

A further object of the present invention is to provide a UAV incorporating ancillary aerodynamic structures mounted in symmetrical combination with the lateral sides of the toroidal fuselage wherein the centers of lift thereof are located aft of the fuselage axis of the toroidal fuselage such that the ancillary aerodynamic structures provide a nose-down pitching moment during forward translational flight modes of the UAV.

These and other objects are achieved by means of an unmanned aerial vehicle (UAV) having a toroidal fuselage and a rotor assembly including counter-rotating rotors coaxially mounted with respect to the toroidal fuselage that incorporates ancillary aerodynamic structures to provide a nose-down pitching moment to counteract the nose-up pitching moment generated by airflow over the toroidal fuselage during forward translational flight modes of the UAV. The ancillary aerodynamic structures may also have a highly cambered airfoil profile that produces high lifting forces. The ancillary aerodynamic structures, which may have a center of lift located significantly aft of the quarter-chord line of the airfoil, are symmetrically mounted in combination with the lateral sides of the toroidal fuselage with the centers of lift thereof located aftwardly of the fuselage axis of the toroidal fuselage to provide a large nose-down pitching moment during forward translational flight modes. In a first embodiment, the ancillary aerodynamic structures are fixedly mounted in combination with the toroidal fuselage at a predetermined angle of incidence. In a second embodiment, the ancillary aerodynamic structures are rotatably mounted in combination with the toroidal fuselage to provide variable incidence ancillary aerodynamic structures for the UAV.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 5A is a top plan view of the UAV embodiment of FIG. 4.

FIG. 5B is a side plan view of the UAV embodiment of FIG. 4.

FIG. 5C is a forward plan view of the UAV embodiment of FIG. 4.

DETAILED DESCRIPTION OF PREFERRED EMBODIMENTS

Figure 1A:
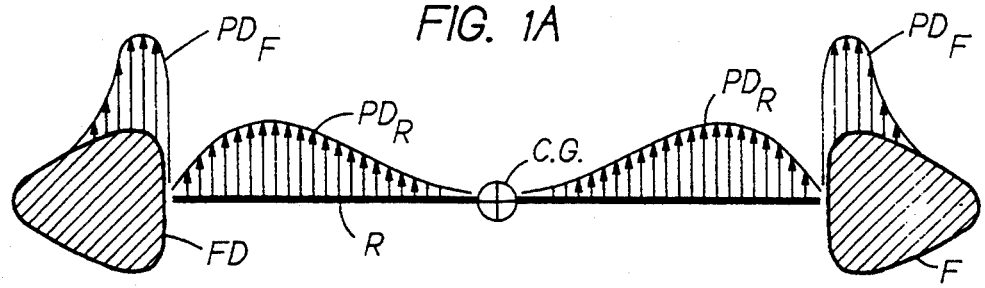
FIGS. 1A–1E illustrate the aerodynamic flight characteristics of an unmanned aerial vehicle (UAV) having a rotor mounted within a toroidal fuselage.
Figure 1B:
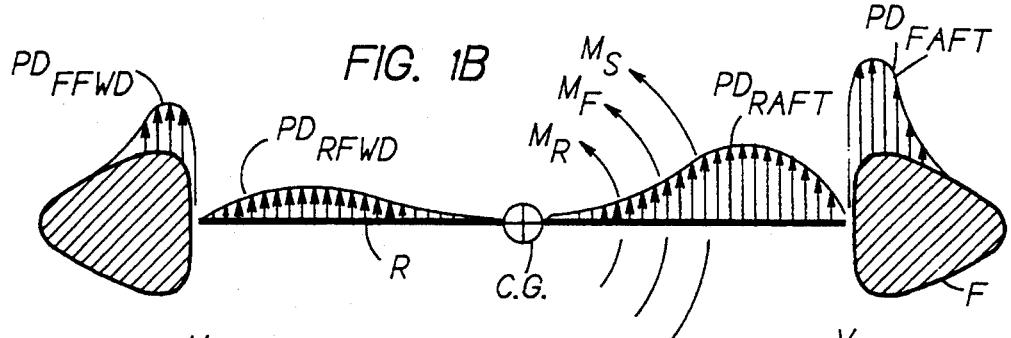
Figure 1C:
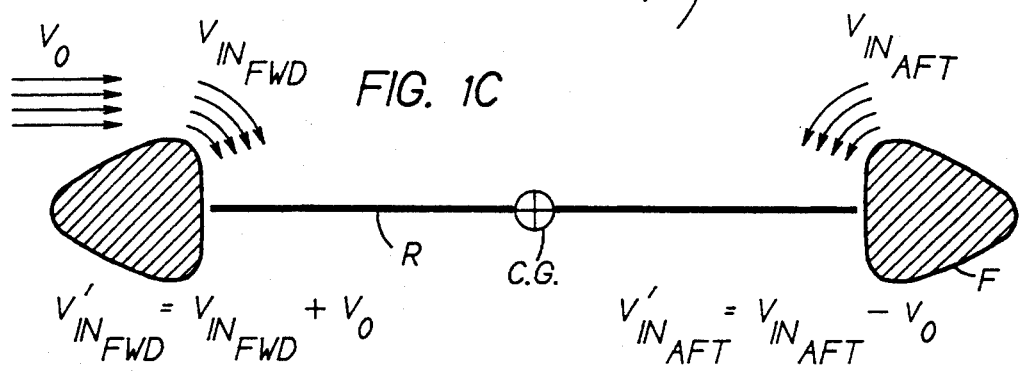
Figure 1D:
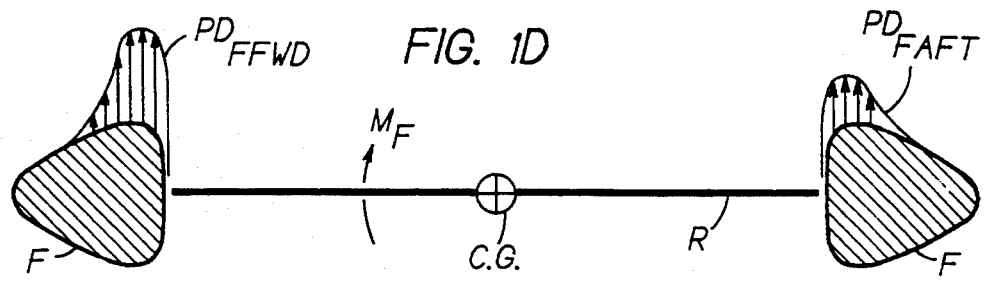
Figure 1E:
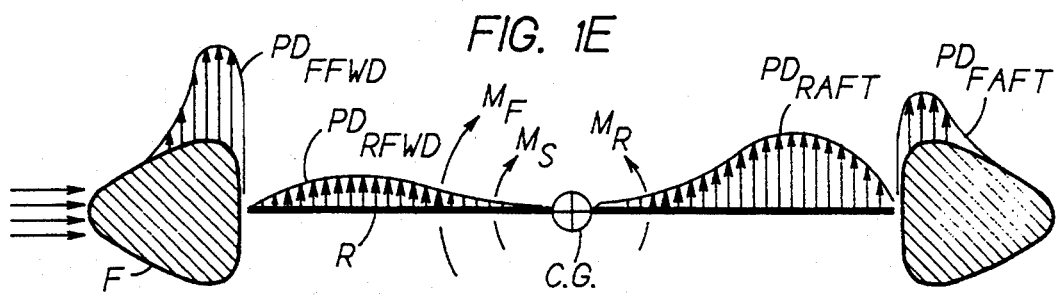
Figure 2:
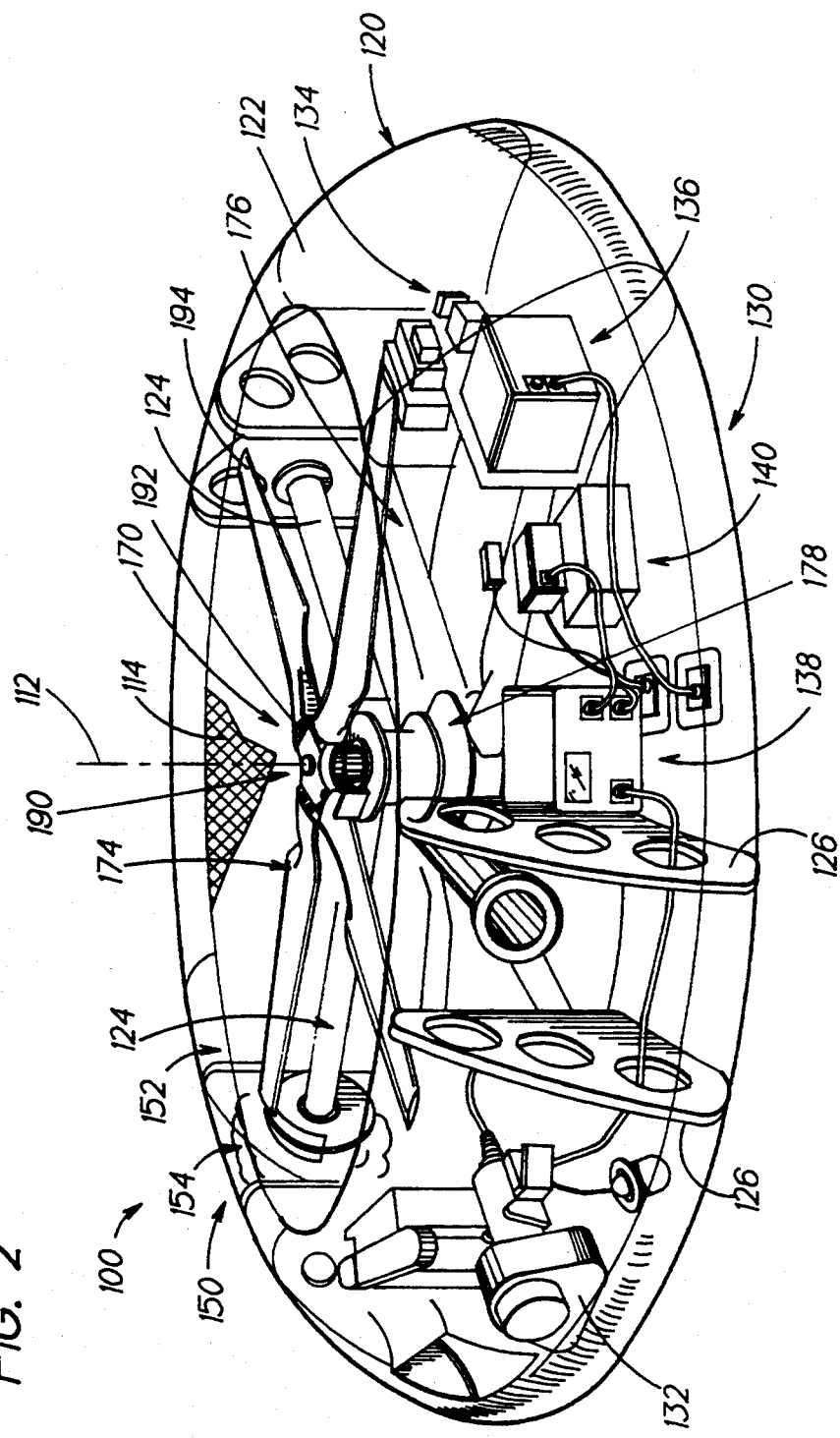
FIG. 2 is a perspective, partially broken away view of one embodiment of an unmanned aerial vehicle (UAV) having counter-rotating rotors mounted within a toroidal fuselage.
Figure 3:
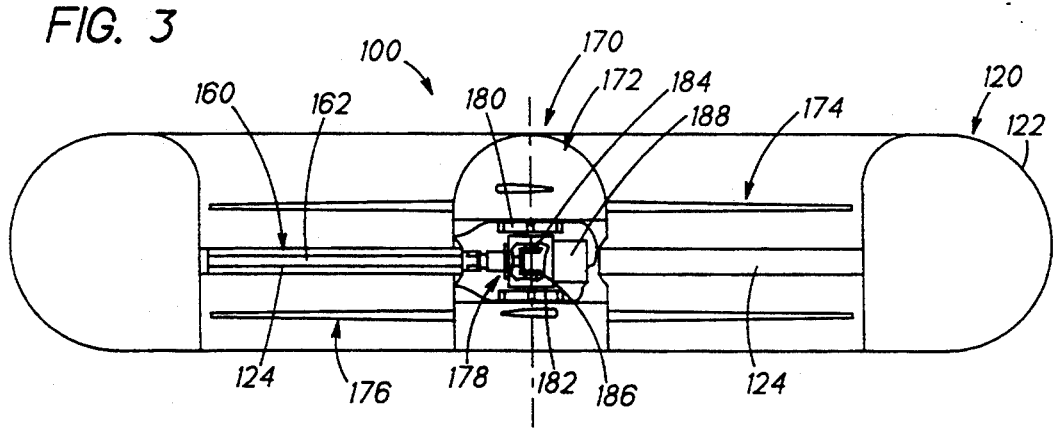
FIG. 3 is a cross-sectional view of the UAV of FIG. 2.
Figure 4:
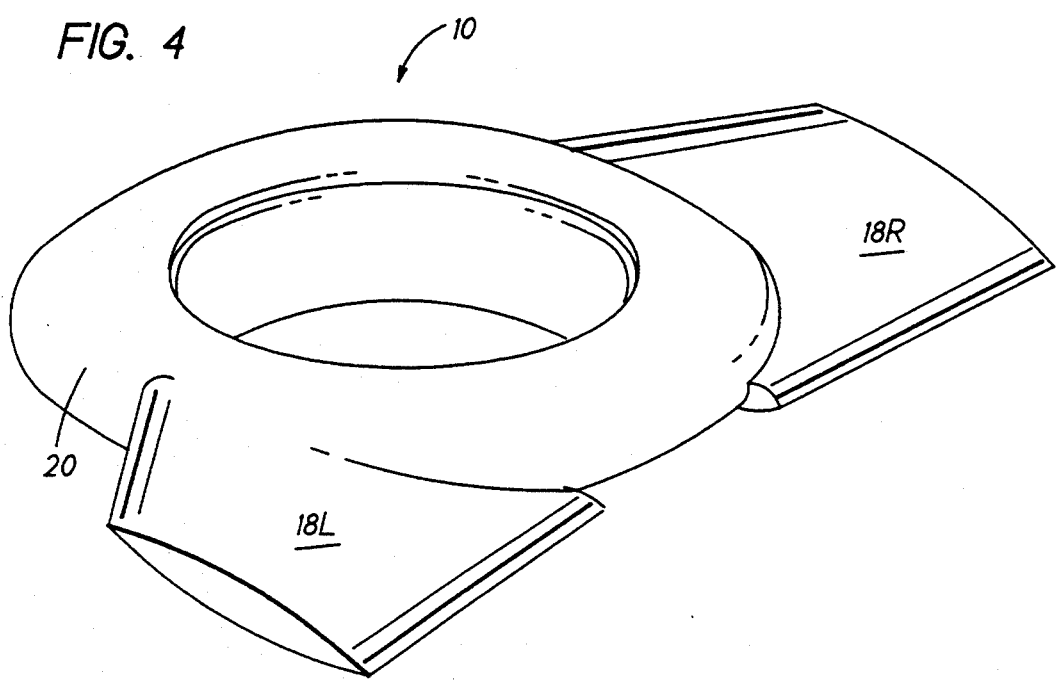
FIG. 4 is a perspective view of a first embodiment of a UAV incorporating ancillary aerodynamic structures according to the present invention.

Referring now to the drawings wherein like reference characters identify corresponding or similar elements throughout the several views, FIGS. 2 and 3 illustrate an exemplary embodiment of an unmanned aerial vehicle (UAV) 100. The exemplary embodiment of the UAV 100 comprises a toroidal fuselage or shroud 120 having a generally hemicylindrical aerodynamic profile 122, flight/mission equipment 130, a powerplant subsystem 150, and a bearingless rotor assembly 170. The embodiment of the UAV 100 described herein has a toroidal fuselage diameter of about 6.5 feet, a toroidal fuselage envelope height of about 1.6 feet, an empty vehicle weight of about 175 pounds, and a gross vehicle weight of about 250 pounds. Reference numeral 112 illustrated in FIG. 2 defines the fuselage axis of the UAV 100.

The toroidal fuselage 120 has a plurality of support struts 124 (three for the described embodiment) integrally formed with and extending radially outwardly from the inner periphery of the toroidal fuselage 120 to the rotor assembly 170. The support struts 124 are rigidly attached to the rotor assembly 170 and operative to support the rotor assembly 170 in a fixed coaxial relation with respect to the toroidal fuselage 120, i.e., the rotational axis of the rotor assembly 170 coincides with the fuselage axis 112. The support struts 124 are hollow structures to minimize the overall weight of the UAV 100, and to provide conduits for interconnecting operating elements of the UAV 100. For example, the engine drive shaft (refer to description hereinbelow) is routed through one of the support struts 124, as illustrated in FIG. 3. In addition, the electrical interface wiring for the electronic control servo subsystem (refer to description hereinbelow) is routed through another support strut 124.

The toroidal fuselage 120 and the plurality of support struts 124 are preferably fabricated from composite material to provide a high strength structure of minimal weight. The various types of high tensile strength fibrous materials and resins having utility in the formation of aerospace composite structures are well known to those skilled in the art. The toroidal fuselage 120 is fabricated as a closed toroid to provide maximal structural strength. The toroidal fuselage 120 is a partially hollow structure, and fabricated so as to provide a plurality of accessible internal bays 126.

Forward located internal bays 126 are typically utilized for sundry flight/mission equipment 130 as described hereinbelow. The mission payload equipment 132 is preferably located, but not limited to, the internal bay 126 at the 180° azimuthal station (the forward station). Generally, the mission payload equipment 132 will consist of some type of passive sensor(s), e.g., infrared detector(s), television camera(s), etc., and/or active device(s), e.g., laser(s), radio communications gear, radar, etc., and the associated processing equipment, and the forward internal bay 126 provides a good field-of-view for such mission payload equipment 132. Other flight/mission equipment 130 such as avionics 134, navigation equipment 136, flight computer 138, communications gear 140 (for relaying real time sensor data and receiving real time command input signals), antennae, etc., are distributed in the various internal bays 126 as exemplarily illustrated in FIG. 2. Distribution of the various flight/mission equipment 130 is optimized in conjunction with the placement of the powerplant subsystem 150 as described hereinbelow.

The powerplant subsystem 150 includes one or more fuel tanks 152, an engine 154, and a drive train assembly 160. The fuel tanks 152 are disposed within appropriate internal bays 26, preferably in opposed equipment bays 26 at the 90°, 270° azimuthal stations (the lateral stations) to maintain a relatively constant center of gravity (C.G.) for the UAV 100 during flight operations. The engine 154 is mounted within an internal bay 126. The positioning of the power subsystem components is optimized to counterbalance the weight of the flight/mission equipment 130, which is disposed in the opposite portion of the toroidal fuselage 120 as described hereinabove, so that the C.G. of the UAV 100 coincides with the fuselage axis 112.

The exemplary embodiment of the UAV 100 described herein preferably utilizes a modified Norton Motors rotary engine, Model NR801T which provides a high power to weight ratio and good partial power fuel consumption. The modified NR801T engine 154 is an air/liquid cooled engine that produces 45 HP at 6,000 RPM. Operation of the engine 154 is controlled and monitored by the flight computer 138. The drive train assembly 160 is operative to transfer the power developed by the engine 154 to the rotor assembly 170 by means of a drive shaft 162 (see FIG. 3). The drive train assembly 160 may be of the type disclosed in commonly-owned, U.S. Pat. No. 5,226,350, entitled A DRIVE TRAIN ASSEMBLY FOR A ROTOR ASSEMBLY HAVING DUCTED, COAXIAL COUNTER-ROTATING ROTORS.

The rotor assembly 170 includes a rotor housing 172, a pair of multi-bladed, counter-rotating rotors 174, 176 coaxially aligned with the fuselage axis 112, and a coaxial transmission subassembly 178. The coaxial transmission subassembly 178 includes first and second swashplate subassemblies 180, 182, corresponding gear trains 184, 186 (spiral gears for the exemplary embodiment described herein), and an electronic control servo subsystem 188 disposed within the rotor housing 172. The coaxial transmission subassembly 178, which may be of the type disclosed in commonly-owned, co-pending U.S. patent application Ser. No. 07/903,065, filed Jun. 22, 1992, entitled A COAXIAL TRANSMISSION/CENTER HUB SUBASSEMBLY FOR A ROTOR ASSEMBLY HAVING DUCTED, COAXIAL COUNTER-ROTATING ROTORS, is operative to transfer power from the powerplant subassembly 150 to the counter-rotating rotors 174, 176. The configuration of the coaxial transmission subassembly 178 may be design optimized to minimize the separation between the upper and lower counter-rotating rotors 174, 176 to provide a UAV 100 having a compact structural and aerodynamic envelope. The configuration of the coaxial transmission subassembly 178 may be design optimized to facilitate transfer of dynamic loads developed by the counter-rotating rotors 174, 176 and to reduce airframe vibration levels by providing a direct load path between the upper and lower counter-rotating rotors 174, 176 such that bending moments produced thereby are canceled during flight operations.

The swashplate subassemblies 180, 182, which may be of the type illustrated and described in U.S. Pat. Nos. 3,409,249 and 2,957,527, or as disclosed in commonly-owned, co-pending U.S. patent application Ser. No. 07/903,065, filed Jun. 22, 1992, entitled A COAXIAL TRANSMISSION/CENTER HUB SUBASSEMBLY FOR A ROTOR ASSEMBLY HAVING DUCTED, COAXIAL COUNTER-ROTATING ROTORS, are operative to selectively mechanically couple cyclic pitch inputs and/or collective pitch inputs to the respective counter-rotating rotors 174, 176. The electronic control servo subsystem 188, which may be of the type illustrated and described in U.S. Pat. No. 5,058,824, entitled SERVO CONTROL SYSTEM FOR A COAXIAL ROTARY WINGED AIRCRAFT, or of the type disclosed in commonly-owned, co-pending U.S. patent application Ser. No. 07/903,065, filed Jun. 22, 1992, entitled A COAXIAL TRANSMISSION/CENTER HUB SUBASSEMBLY FOR A ROTOR ASSEMBLY HAVING DUCTED, COAXIAL COUNTER-ROTATING ROTORS, is operative to control the functioning of the swashplate subassemblies 180, 182, by coupling inputs from the UAV flight computer 138 to the swashplate subassemblies 180, 182. The gear trains 184, 186, which are driven by the drive shaft 162 of the powerplant assembly 150 described hereinabove, are operative to impart rotary motion to the respective counter-rotating rotors 174, 176.

Each counter-rotating rotor 174, 176 of the exemplary embodiment, which is preferably of the rigid rotor type (as opposed to articulated rotors) to reduce the complexity and weight of the rotor assembly 170, includes a rotor hub 190, four snubber assemblies 192, and four rotor blade assemblies 194. Each rotor blade assembly 194, which may be of the type disclosed in commonly-owned, co-pending U.S. patent application Ser. No. 07/903,061, filed Jun. 22, 1992, entitled A ROTOR BLADE SUBASSEMBLY FOR A ROTOR ASSEMBLY HAVING DUCTED, COUNTER-ROTATING ROTORS, includes an inner flexbeam, an integrated torque tube/spar member, and an external aerodynamic fairing or rotor blade. The flexbeam is preferably a laminated composite structure that is operative to react the centrifugal loads and a majority of the bending loads developed by the rotor assembly 170. The flexbeam may have a predetermined linear twist along the span thereof so that the pretwisted flexbeam is unstrained during specified forward flight cruise modes. The integrated torque tube/spar member is formed as a continuous, filament wound tubular composite structure having high torsional and bending stiffness.

The integrated torque tube/spar member provides a continuous torsional load path and facilitates load coupling between the rotor blade and the pretwisted flexbeam. The spar segment of the integrated torque tube/spar member, which functions as the primary structural member of the rotor blade assembly, is operative to react all bending, torsional, shear and centrifugal dynamic loads of the rotor assembly 170. The torque tube section of the integrated torque tube/spar member is operative to react all torsional loads and some of the bending loads of the rotor assembly 170.

The rotor blade may be fabricated from a high modulus composite material and is preferably configured to have a high aerodynamic taper such that the tapered rotor blade has a low outboard mass, a high inboard stiffness, and a high chordwise frequency. The high chordwise frequency of the tapered rotor blade allows the rotor assembly 170 to be operated over a weaker modal response zone. The tapered rotor blade may be further configured to include a triangularly shaped trailing edge segment that is responsive to the aerodynamic pressures encountered during operation of the shrouded counter-rotating rotors 174, 176. Each snubber assembly 192 is installed inboard of the flexbeam-to-hub attachment joint to allow the use of self-aligning bearings rather than elastomeric bearings, which are more costly.

The rotors 174, 176 are aerodynamically "shrouded" by the toroidal fuselage 120. Blade pitch changes induced in the counter-rotating rotors 174, 176, i.e., cyclic and/or collective pitch inputs, are utilized to generate all required lift, pitch, roll, and yaw control of the UAV 100. Such pitch changes are also utilized to regulate the pattern and velocity of airflow over the toroidal shroud 120 and into the rotor assembly 170. Such control of the airflow creates a lifting component on the toroidal shroud 120 that augments the lift provided by the counter-rotating rotors 174, 176, as described hereinabove.

Preferably, the UAV 100 of the present invention includes an inlet screen 114, disposed as partially illustrated in FIG. 2, to protect the rotor assembly 170 from FOD. The UAV 100 may also include an outlet screen (not illustrated) to similarly protect the rotor assembly 100.

A first embodiment of a UAV 10 according to the present invention is illustrated generally in FIGS. 4, 5A–5C. The UAV 10 generally includes the structural and functional features described hereinabove, to wit, a toroidal fuselage 20 having an aerodynamic profile 22 (a hemicylindrical profile is illustrated in FIG. 5B), flight/mission equipment disposed within the bays of the toroidal fuselage 20, a powerplant subassembly disposed within the bays of the toroidal fuselage 20, and a bearingless rotor assembly comprised of counter-rotating rotors coaxially mounted (by means of radial support struts) with respect to the toroidal fuselage 20. The forgoing subsystems and assemblies not necessary to an understanding of the present invention have been omitted from FIGS. 4, 5A–5C to simplify the following disclosure.

Forward translational flight of the UAV 10 coincides with the longitudinal axis thereof. As described herein, the longitudinal axis of the UAV 10 is defined by the 180°, 0°/360° azimuthal orientations illustrated in FIG. 5A, the 180° azimuth identifying the forward direction for, and the forward station of, the UAV 10. Reference numeral 12 in FIG. 5A defines the fuselage axis of the UAV 10 (as well as the rotational axis of the rotor assembly).

The UAV 10 according to the present invention incorporates ancillary aerodynamic structures 18L, 18R to counteract the adverse nose-up pitching moment experienced by the UAV 10 due to airflow over the toroidal fuselage in forward translational flight. The ancillary aerodynamic structures 18L, 18R have an aerodynamic configuration that provides pressure distribution forces to generate lifting forces that supplement the lifting forces generated by the rotor assembly and the toroidal fuselage 20. The aerodynamic configuration of the ancillary aerodynamic structures 18L, 18R, and the mounting thereof in combination with the toroidal fuselage 20, coactively provide a nose-down pitching moment during forward translational flight of the UAV 10 that counteracts the nose-up pitching moment generated by airflow over the toroidal fuselage 20 during such flight modes, thereby reducing the power required from the rotor assembly for trimmed forward translational flight of the UAV 10.

The aerodynamic configuration of the ancillary aerodynamic structures 18L, 18R of the UAV 10 is selected to provide high lifting forces and a large nose-down pitching moment in forward translational flight. To achieve these aerodynamic characteristics, the ancillary aerodynamic structures 18L, 18R have an airfoil profile 18P (see FIG. 5B) that is cambered, and preferably highly cambered, so that the ancillary aerodynamic structures 18L, 18R generate high lift forces during forward translational flight of the UAV 10. Further, the ancillary aerodynamic structures may have a center of lift 18C (see FIG. 5A) that is significantly aft of the quarter-chord line (identified by reference characters QC in FIG. 5A) of the airfoil at nominal forward translational flight cruise modes. The aft center of lift 18C, through which the lifting forces act, in conjunction with the mounting of the ancillary aerodynamic structures 18L, 18R as described hereinbelow, coactively provide the large nose-down pitching moment.

Figure 6A:
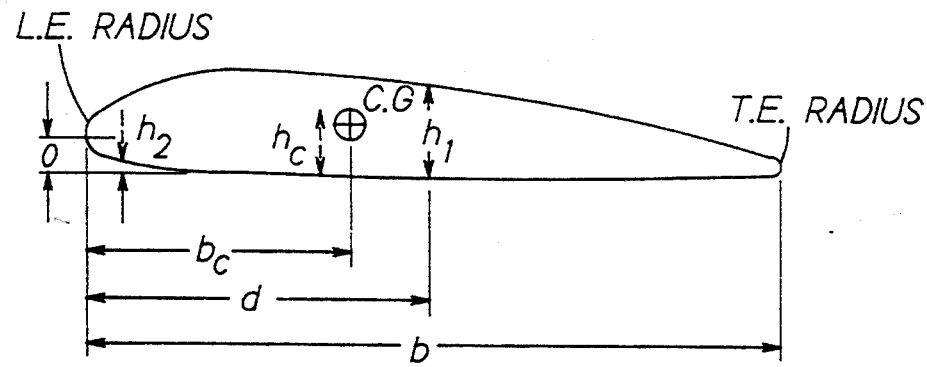
FIG. 6A is a plan view of a Clark Y airfoil profile.
Figure 6B:
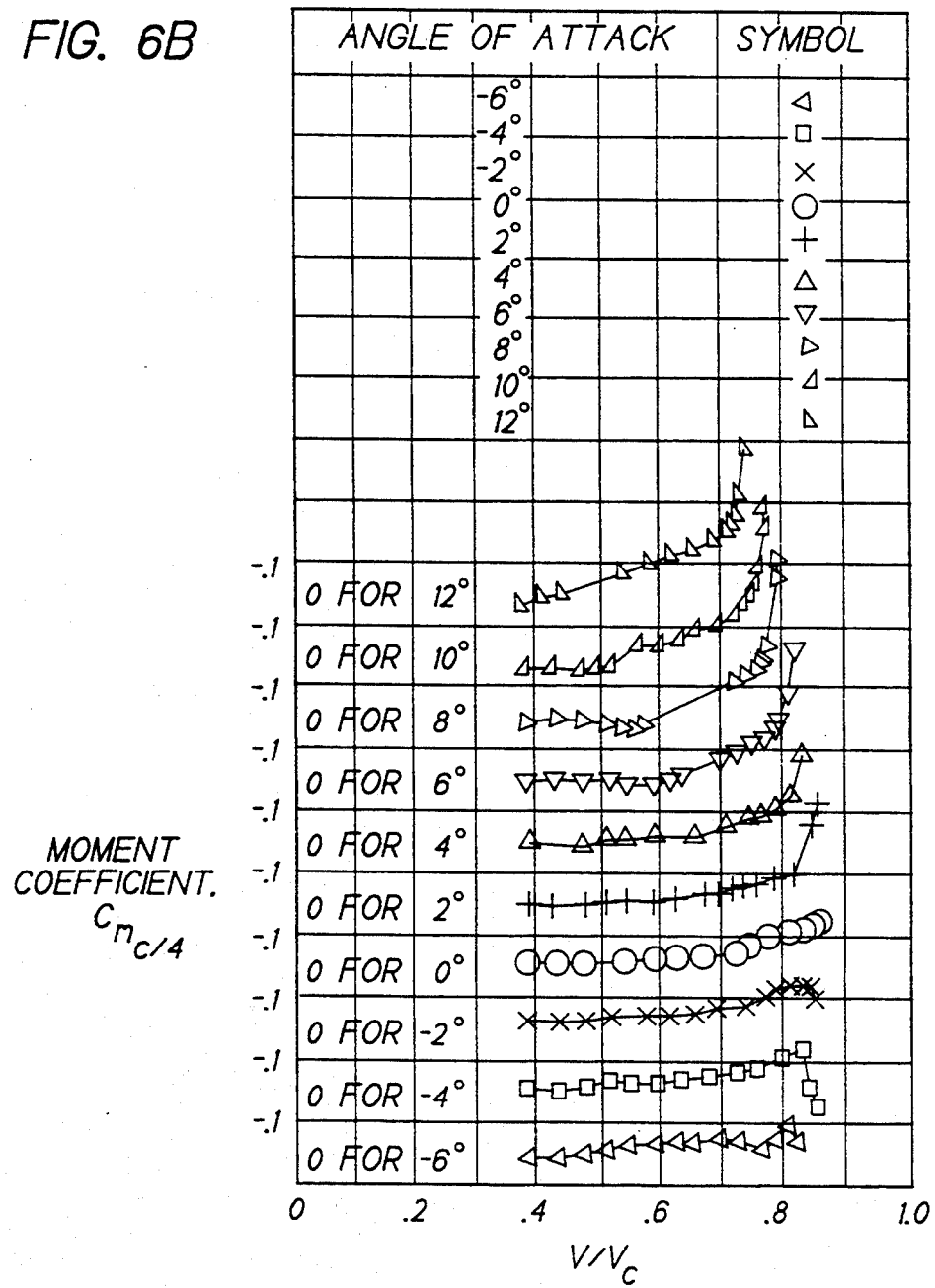
FIG. 6B is a graph of moment coefficients for a Clark Y airfoil.

A Clark Y airfoil, which is a highly cambered airfoil having an aft center of pressure, has particular utility as the airfoil configuration of the ancillary aerodynamic structures 18L, 18R for the UAV 10. The pertinent parameters of the Clark Y airfoil are illustrated in FIGS. 6A, 6B and described in Table I (see FIG. 6A for parameter definitions). One skilled in the art will appreciate that other aft-loaded airfoils having a cambered or highly cambered profile may be utilized as the airfoil configuration for the ancillary aerodynamic structures 18L, 18R of the UAV 10.

To optimize the aerodynamic effects of the ancillary aerodynamic structures 18L, 18R described hereinabove, the ancillary aerodynamic structures 18L, 18R of the embodiment of the UAV 10 illustrated in FIGS. 4, 5A–5C are symmetrically fixedly mounted (utilizing conventional mounting techniques) to the lateral sides of the toroidal fuselage 20 (leading edges at about the 90°, 270° azimuthal orientations, respectively). This mounting configuration ensures that the centers of lift 18C of the ancillary aerodynamic structures 18L, 18R are positioned aft of the fuselage axis 12 of the UAV 10 during forward translational flight operations. Such positioning ensures that the pitching moment provided by the ancillary aerodynamic structures 18L, 18R in forward translational flight is a nose-down pitching moment of sufficient magnitude to counteract the nose-up pitching moment generated by airflow over the toroidal fuselage 20.

TABLE I

| d/b | $h_1/h$ | $h_2/h$ |
| --- | --- | --- |
| 0.000 | 0.2950 | 0.2950 |
| 0.025 | 0.5490 | 0.1281 |
| 0.050 | 0.6625 | 0.0811 |
| 0.100 | 0.8055 | 0.0384 |
| 0.200 | 0.9570 | 0.0085 |
| 0.300 | 0.9950 | 0.0000 |
| 0.400 | 0.9830 | 0.0000 |
| 0.500 | 0.9280 | 0.0000 |
| 0.600 | 0.8290 | 0.0000 |
| 0.700 | 0.6835 | 0.0000 |
| 0.800 | 0.5210 | 0.0000 |
| 0.900 | 0.3375 | 0.0000 |
| L.E. radius | 0.13 | |
| T.E. radius | 0.08 | |
| $h_c$ | 0.416h | |
| $b_c$ | 0.4405b | |
| Area | 0.7245h | |
| $I_{major}$ | $.0418b^3h$ | |
| $I_{minor}$ | $.0454bh^3$ | |

The ancillary aerodynamic structures 18L, 18R are fixedly mounted in combination with the toroidal fuselage 20 at a predetermined angle of incidence $\theta$. The predetermined angle of incidence $\theta$ ensures that the ancillary aerodynamic structures 18L, 18R generate high lifting forces for the forward translation flight modes wherein the leading edge (180° azimuth) of the toroidal fuselage 20 is tilted downwardly (see Table II) to provide the propulsive force for the UAV 10. The center of lift of the toroidal fuselage 20 in forward translational flight modes may be as much as 0.4 rotor radii (about 3–5 inches) forward of the fuselage axis 12. For the embodiment described hereinabove, the predetermined angle of incidence $\theta$ is about 18°, which resulted in the ancillary aerodynamic structures 18L, 18R providing a zero lift angle of attack $\alpha$ of about $-22°$ (see FIG. 7).

In addition to the foregoing characteristics, the ancillary aerodynamic structures 18L, 18R for the UAV 10 should have a low aspect ratio so that the UAV 10 is maintained at a reasonable size. Taper of the ancillary aerodynamic structures 18L, 18R, in combination with the low aspect ratio, are selected to optimize the lift distribution over the ancillary aerodynamic structures 18L, 18R to achieve the aerodynamic effects described hereinabove.

Figure 7:
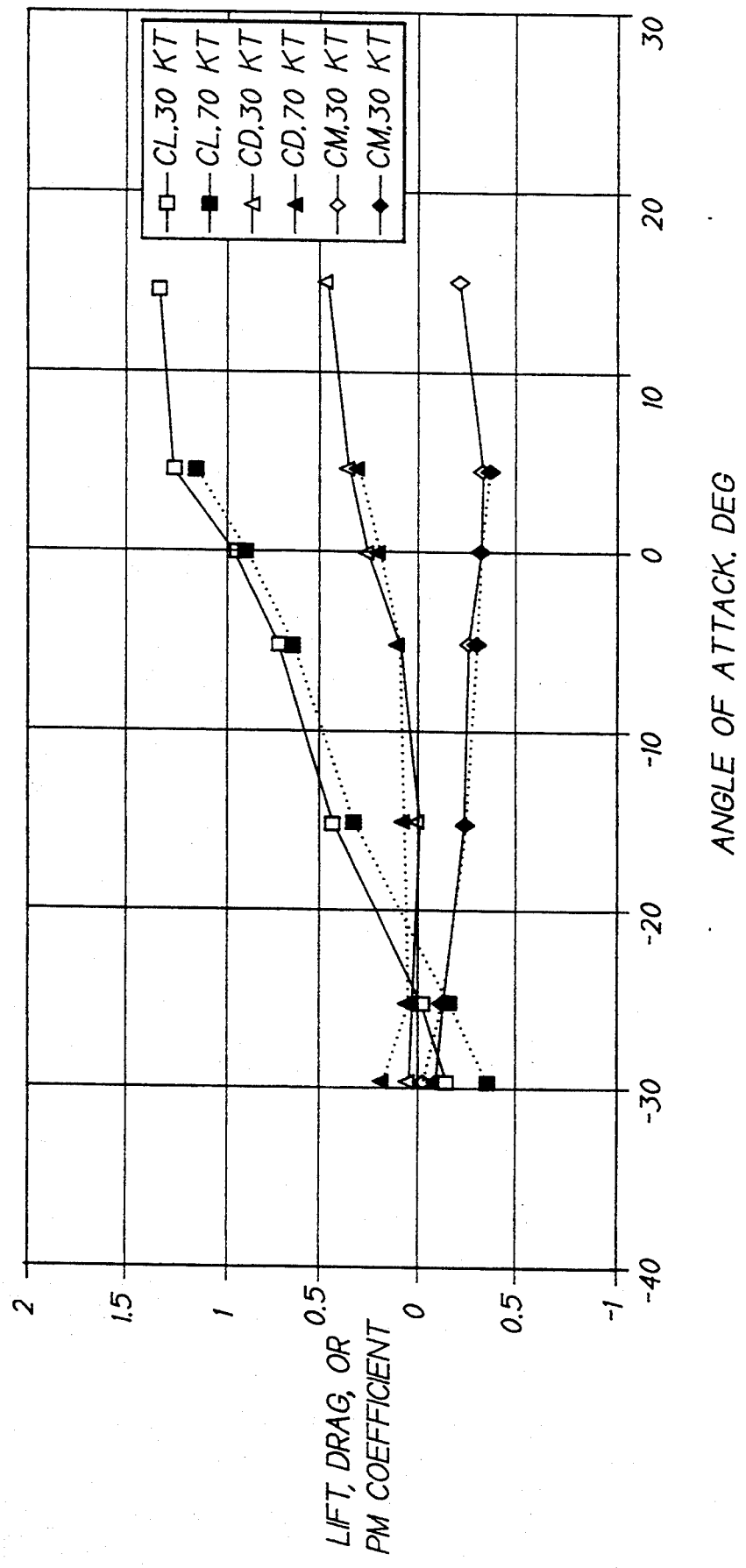
FIG. 7 is a graph illustrating the aerodynamic effects of a UAV incorporating ancillary aerodynamic structures.

An unpowered, 0.29 scale toroidal shroud 20 incorporating ancillary aerodynamic structures 18L, 18R as described hereinabove was subjected to subsonic wind tunnel testing. FIG. 7 and Table II describe the aerodynamic characteristics of the unpowered, 0.29 scale toroidal shroud 20 incorporating ancillary aerodynamic structures 18L, 18R. With respect to Table II, V represents the forward translational velocity of the UAV, Alpha represents the angle of attack of the toroidal shroud, $C_M$ is the pitching moment coefficient of the ancillary aerodynamic structures 18L, 18R, Q is the dynamic pressure, A is the surface area of the ancillary aerodynamic structures 18L, 18R, M is the nose-down pitching moment acting on the UAV (the product of $ACQC_M$) due to the ancillary aerodynamic structures 18L, 18R, X is the offset of the center of lift of the UAV (with respect to the fuselage axis 12) due to the incorporation of the ancillary aerodynamic structures 18L, 18R, X/R is a ratio of the offset to the rotor assembly radius, $C_L$ is the lift coefficient of the UAV, and Lift is the product of $AQC_L$.

TABLE II

| UAV Wing Effect | | | | | |
|---|---|---|---|---|---|
| V, Kts | 10 | 20 | 30 | 40 | 50 |
| Lift | 250 | 250 | 250 | 250 | 250 |
| Alpha | −7 | −15 | −23 | −31 | −40 |
| $C_M$ | −0.3 | −0.25 | −0.2 | −0.12 | −0.03 |
| Q | 0.338645 | 1.354578 | 3.047801 | 5.418313 | 8.466113 |
| A | 28.18074 | 28.18074 | 28.18074 | 28.18074 | 28.18074 |
| Chord, | 3.778621 | 3.778621 | 3.778621 | 3.778621 | 3.778621 |
| M, ft | −10.8181 | −36.0603 | −64.9086 | −69.2358 | −27.0452 |
| X, in | −0.51927 | −1.7309 | −3.11561 | −3.32332 | −1.29817 |
| X/R | −0.02164 | −0.07212 | −0.12982 | −0.13847 | −0.05409 |
| $C_L$ | 0.55 | 0.35 | 0.1 | −0.3 | |
| Lift | 5.248789 | 13.36055 | 8.588927 | −45.8076 | |

An examination of these aerodynamic characteristics reveals that the incorporation of the ancillary aerodynamic structures 18L, 18R contributes to the offset of the center of lift of the toroidal fuselage (with respect to the fuselage axis), particularly in the 30–40 knot flight regime of the UAV. Such an offset enhances the pitching moment characteristics of the UAV, especially nose-down pitching moment provided by the ancillary aerodynamic structures 18L, 18R as a result of the increased moment arm for the lift forces generated by the ancillary aerodynamic structures 18L, 18R. The ancillary aerodynamic structures 18L, 18R according to the present invention provide a nose-down pitching moment that counteracts the nose-up pitching moment generated by the toroidal fuselage 20, thereby minimizing the power required from the rotor assembly for trimmed forward translational flight of the UAV 10.

Figure 8A:
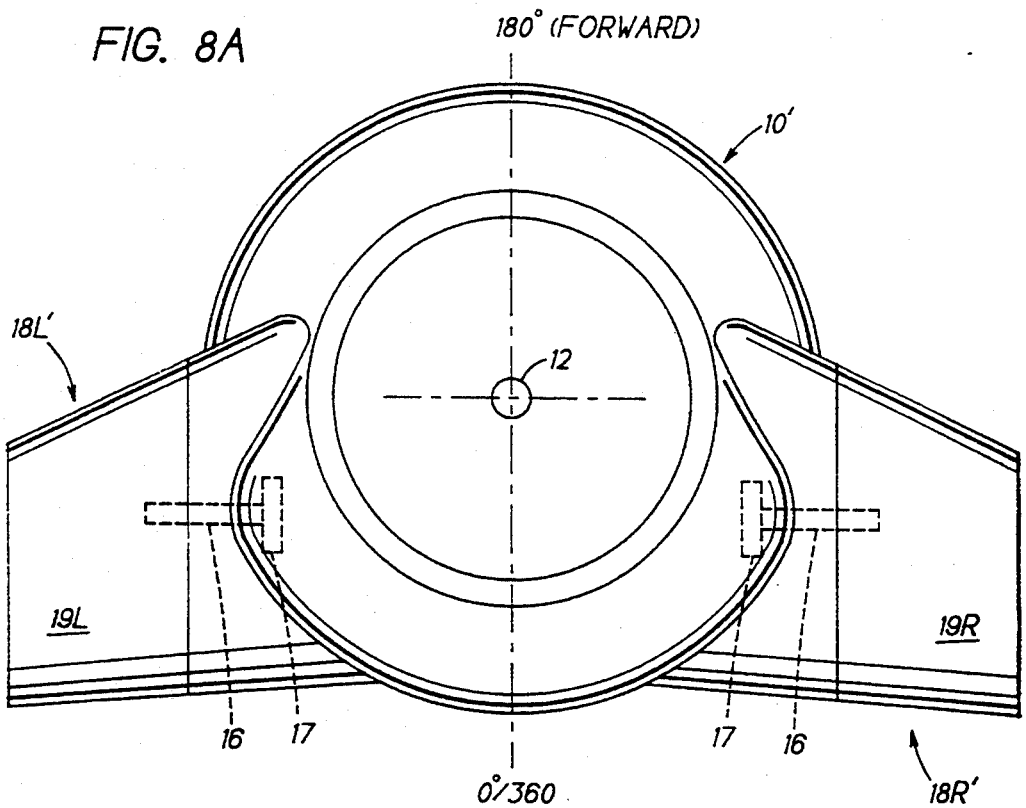
FIGS. 8A, 8B are top and side plan views, respectively, of a second embodiment of a UAV incorporating ancillary aerodynamic structures according to the present invention.
Figure 8B:
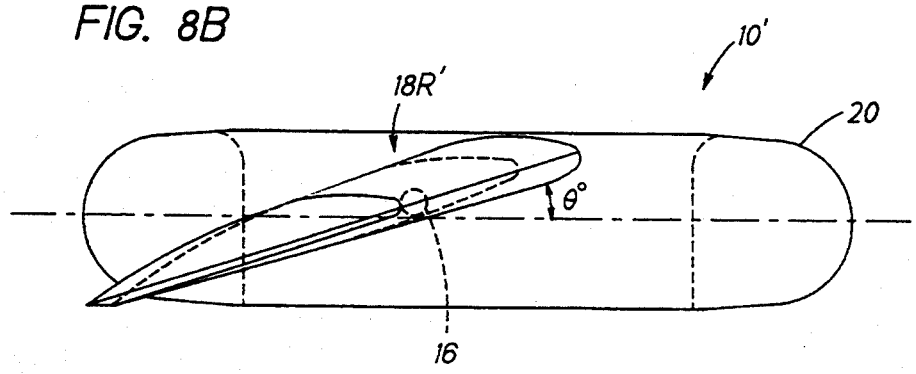

A second embodiment of a UAV 10' according to the present invention is illustrated in FIGS. 8A, 8B and incorporates ancillary aerodynamic structures 18L', 18R' that include outboard segments 19L, 19R that are rotatably mounted in combination with the toroidal shroud 20 to provide variable incidence ancillary aerodynamic structures 18L', 18R'. The second embodiment includes a mounting means 16 for mounting the outboard segments 19L, 19R of the ancillary aerodynamic structures 18L', 18R' in rotatable combination (a rotatable shaft is illustrated in FIGS. 8A, 8B) with the toroidal fuselage 20 and a means 17 operatively interconnected to the mounting means 16 for providing rotation thereof. Operation of the means 17 may be controlled through the flight computer of the UAV 10'. The means 16, 17 are coactively operative to vary the angle of incidence θ' of the outboard segments 19L, 19R of the ancillary aerodynamic structures 18L', 18R' during flight operations to achieve the optimum aerodynamic effect therefrom. For example, the means 16, 17 may be coactively operated to rotate the outboard segments 19L, 19R of the ancillary aerodynamic structures 18L', 18R' to a generally vertical position, i.e., angle of incidence θ' of about 90°, during hover flight operations to minimize the flow disturbance effects of the ancillary aerodynamic structures 18L', 18R' during the hover flight mode. During forward translational flight, the means 16, 17 may be coactively operated to rotate the outboard segments 19L, 19R of the ancillary aerodynamic structures 18L' 18R' to a predetermined angle of incidence θ' that provides the optimum effective angle of attack α' for the ancillary aerodynamic structures 18L', 18R' for the given forward translational flight mode.

A variety of modifications and variations of the present invention are possible in light of the above teachings. It is therefore to be understood that, within the scope of the appended claims, the present invention may be practiced otherwise than as specifically described hereinabove.

What is claimed is:
1. An unmanned aerial vehicle, comprising:
a toroidal fuselage having a coaxial fuselage axis and a longitudinal axis, said toroidal fuselage being fabricated as a closed toroid that is a partially hollow structure that provides a plurality of accessible internal bays and wherein said toroidal fuselage is symmetric with respect to said coaxial fuselage axis and said longitudinal axis, said symmetrical toroidal fuselage defining an inner flow duct, airflow over said symmetrical toroidal fuselage and through said inner flow duct during forward translational flight modes of said unmanned aerial vehicle defining a center of lift for said unmanned aerial vehicle, the airflow causing a nose-up pitching moment on said unmanned aerial vehicle acting through said center of lift;
rotor assembly means for providing collective and cyclic pitch to control flight operations of said unmanned aerial vehicle, said rotor assembly means including a pair of multi-bladed, counter- rotating rotors coaxially mounted in combination with said symmetrical toroidal fuselage in said inner flow duct, said multi-bladed, counter-rotating rotors having an axis of rotation coaxial with said fuselage axis; and first and second ancillary aerodynamic structures only symmetrically mounted in combination with respective lateral sides of said symmetrical toroidal fuselage, said first and second ancillary aerodynamic structures having a cambered airfoil profile to provide high lifting forces during forward translational flight modes of said unmanned aerial vehicle;

said first and second ancillary aerodynamic structures having centers of lift, and wherein said first and second ancillary aerodynamic structures are symmetrically mounted so that said centers of lift are aft of said fuselage axis during forward translational flight modes of said unmanned aerial vehicle;

said first and second ancillary aerodynamic structures causing an offset of said center of lift of said symmetrical toroidal fuselage along said longitudinal axis thereof during forward translational flight modes of said unmanned aerial vehicle wherein said high lifting forces of said first and second ancillary aerodynamic structures generate a nose-down pitching moment that counteracts the nose-up pitch moment of said symmetrical toroidal fuselage.

2. The unmanned aerial vehicle of claim 1 wherein said first and second ancillary aerodynamic structures are fixedly mounted in combination with said symmetrical toroidal fuselage at a predetermined angle of incidence.

3. The unmanned aerial vehicle of claim 2 wherein said cambered airfoil profile of said first and second ancillary aerodynamic structures is a Clark Y airfoil.

4. The unmanned aerial vehicle of claim 1 wherein said first and second ancillary aerodynamic structures are rotatably mounted in combination with said symmetrical toroidal fuselage to vary an angle of incidence therewith, and wherein said unmanned aerial vehicle further comprises means for mounting said first and second ancillary aerodynamic structures in rotatable combination with said symmetrical toroidal fuselage, and means operatively interconnected to said mounting means for controlling rotation thereof, wherein said mounting means and said controlling means are coactively operative to rotate said first and second ancillary aerodynamic structures to vary said angle of incidence thereof with respect to said symmetrical toroidal fuselage.

* * * * *